United States Patent [19]

Nilssen

[11] Patent Number: 5,103,139
[45] Date of Patent: Apr. 7, 1992

[54] LAMP STARTING AND OPERATING PROCEDURE IN ELECTRONIC BALLAST

[76] Inventor: Ole K. Nilssen, Caesar Dr., Barrington, Ill. 60010

[21] Appl. No.: 497,311

[22] Filed: Mar. 22, 1990

Related U.S. Application Data

[63] Continuation-in-part of Ser. No. 153,572, Feb. 8, 1988, which is a continuation of Ser. No. 30,554, Mar. 27, 1987, which is a continuation of Ser. No. 693,188, Jan. 22, 1985, which is a continuation-in-part of Ser. No. 454,425, Feb. 22, 1983, abandoned.

[51] Int. Cl.$^5$ ............................................. H05B 37/00
[52] U.S. Cl. .................................. 315/219; 315/223; 315/307; 361/42; 361/45
[58] Field of Search ............... 315/219, 223, 261, 291, 315/307, DIG. 2, DIG. 5, DIG. 7; 361/42, 44–50

[56] References Cited

U.S. PATENT DOCUMENTS 4,563,719  1/1986  Nilssen ................................. 361/45

Primary Examiner—Robert J. Pascal

[57] ABSTRACT

In a power-line-operated power-factor-corrected electronic ballast, a pair of series-connected fluorescent lamps is powered via a tuned L-C circuit that is series-excited by the rectangular-wave 33 kHz voltage output of a half-bridge inverter and parallel-loaded by the fluorescent lamps. Power factor correction is attained via two energy-storing capacitors charged during periods when the instantaneous absolute magnitude of the power line voltage exceeds half of its peak absolute magnitude and discharged when it fails to exceed half of this peak absolute magnitude. As a result, a so-called valley-filled DC voltage is provided to the inverter; which results in the inverter's rectangular-wave output voltage being about 50% amplitude-modulated. In spite of this high degree of amplitude-modulation, the resulting lamp current crest factor is only about 1.8. By control of the symmetry of the inverter's rectangular-wave output voltage, the fluorescent lamp is started and operated in such a manner that maximum available ballast output current is limited to about 30 milli-Ampere (which magnitude of 33 kHz current is considered safe from electric shock hazard) until such time as verification is provided to the effect that this 30 milli-Ampere of 33 kHz current is indeed flowing through both lamps (as opposed to through a ground loop); whereafter the symmetry of the rectangular-wave output voltage is re-controlled such as to provide for the lamp current to increase to some preset level.

18 Claims, 3 Drawing Sheets

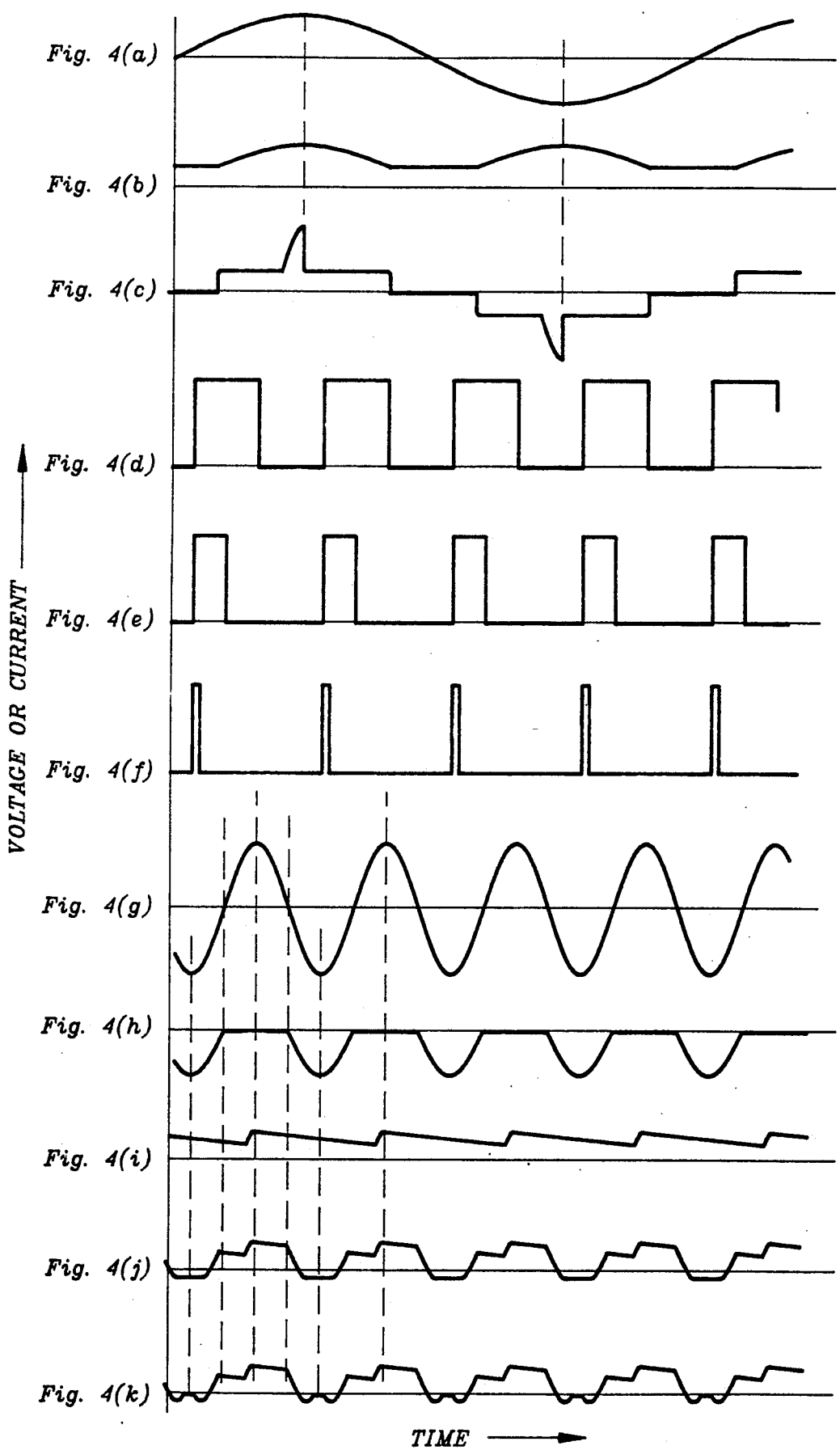

LAMP STARTING AND OPERATING PROCEDURE IN ELECTRONIC BALLAST

RELATED APPLICATIONS

This application is a continuation-in-part of application Ser. No. 07/153,572 filed Feb. 8, 1988; which is a continuation of application Ser. No. 07/030,554 filed 03/27/87; which is a continuation of application Ser. No. 06/693,188 filed Jan. 22, 1985; which is a continuation-in-part of application Ser. No. 06/454,425 filed Feb. 22, 1983, now abandoned.

BACKGROUND OF THE INVENTION

1. Field of the Invention

The present invention relates to lamp starting and operating procedures in electronic ballasts for fluorescent lamps, particularly with respect to providing gentle yet affirmative lamp starting as well as effective protection against electric shock hazard.

2. Description of Prior Art

In conventional electronic ballasts for so-called Rapid-Start fluorescent lamps, the procedure for starting the lamps provides for simultaneous application of cathode heating power and a lamp ignition voltage of magnitude high enough to cause the lamps to ignite as soon as the cathodes have become thermionic. With the many different types of fluorescent lamps presently available, the magnitude of the lamp ignition voltage for igniting the most-difficult-to-ignite lamps is so high as to result in premature ignition of the least-difficult-to-ignite lamps. As a result, the least-difficult-to-ignite lamps are subjected to a pre-ignition glow current of unacceptably large magnitude, thereby giving rise to substantial shortening of their life expectancies.

SUMMARY OF THE INVENTION

Objects of the Invention

An object of the present invention is that of providing for an improved lamp starting and operating procedure in electronic ballasts for fluorescent lamps.

This as well as other objects, features and advantages of the present invention will become apparent from the following description and claims.

Brief Description

In a power-line-operated power-factor-corrected electronic ballast, two series-connected fluorescent lamps are powered via a tuned L-C circuit that is series-excited by the rectangular-wave 33 kHz voltage output of a half-bridge inverter and parallel-loaded by the two series-connected fluorescent lamps.

More particularly, the two series-connected fluorescent lamps are effectively parallel-connected across the tank capacitor of the tuned L-C circuit, thereby being subjected to a Q-multiplied substantially sinusoidal 33 kHz lamp voltage. One of the tank-capacitor's terminals is effectively at ground potential (the "cold" output terminal); the other of the tank capacitor's terminals is at a relatively high potential with respect to ground (the "hot" output terminal).

Power factor correction is attained via two energy-storing capacitors charged when the instantaneous absolute magnitude of the power line voltage exceeds half of its peak absolute magnitude and discharged when it fails to exceed half of this peak absolute magnitude. As a result, a so-called valley-filled DC voltage is provided to the inverter; which results in the inverter's rectangular-wave output voltage being about 50% amplitude-modulated. In spite of this high degree of amplitude-modulation, however, the resulting lamp current crest factor is only about 1.8.

By control of the symmetry of the inverter's rectangular-wave output voltage, the fluorescent lamp is started in such a manner that the maximum 33 kHz current available from the ballast's output (i.e., from the hot terminal) is limited to about 30 milli-Ampere (which magnitude of 33 kHz current is considered safe from electric shock hazard) until such time as current is actually flowing through both lamps. As long as indeed current is flowing through both lamps, the magnitude of the ballast's output current is limited—again by control of the symmetry of the inverter's rectangular output voltage—to the desired lamp operating current magnitude, which is about 350 milli-Ampere.

To minimize pre-ignition lamp glow current, as well as to minimize internal power dissipation during unloaded conditions, the magnitude of the voltage generated across the tank-capacitor is limited prior to lamp ignition—again by control of the symmetry of the inverter's output voltage—to a magnitude somewhat higher than normal lamp operating voltage. To provide for affirmative lamp ignition, this magnitude is caused to increase (again by symmetry control) by a factor of nearly two for a period of about 20 milli-second once each second.

BRIEF DESCRIPTION OF THE DRAWINGS

FIG. 4 illustrates typical voltage and current waveforms associated with the preferred embodiment of the invention.

DESCRIPTION OF THE PREFERRED EMBODIMENT

Figure 1:
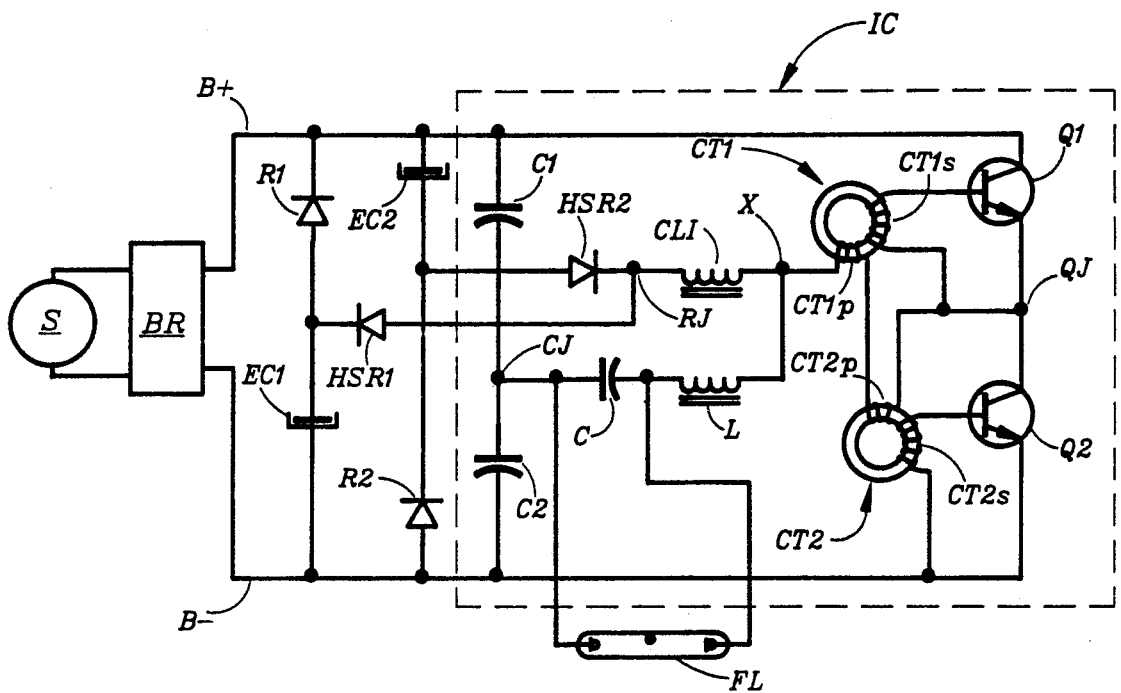
FIG. 1 schematically illustrates a basic electronic ballast incorporating the power-factor-correction feature and the half-bridge inverter of the preferred embodiment of the invention.

Details of Construction of the Circuit of FIG. 1

In FIG. 1, a source S of 120 Volt/60 Hz voltage is applied to a full-wave bridge rectifier BR, the unidirectional voltage output of which is applied directly between a B+ bus and a B− bus, with the positive voltage being connected to the B+ bus.

Between the B+ bus and the B− bus are connected a series-combination of two transistors Q1 and Q2 as well as a series-combination of two film-type capacitors C1 and C2.

An energy-storing electrolytic capacitor EC1 is connected in series with a rectifier R1, with the anode of R1 being connected with the positive terminal of EC1. The negative terminal of EC1 is connected directly with the B− bus; and the cathode of R1 is connected directly with the B+ bus.

Another energy-storing electrolytic capacitor EC2 is connected in series with a rectifier R2, with the cathode of R2 being connected to the negative terminal of EC2. The positive terminal of EC2 is connected directly with the B+ bus; and the anode of rectifier R2 is connected directly with the B− bus.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected in parallel circuit across capacitor C.

An current-limiting inductor CLI is connected with one of its terminals to point X. The other terminal of CLI is connected directly to the junction RJ between the anode of a high-speed rectifier HSR1 and the cathode of another high-speed rectifier HSR2. The cathode of HSR1 is connected directly with the positive terminal of electrolytic capacitor EC1; and the anode of HSR2 is connected directly with the negative terminal of electrolytic capacitor EC2.

Part of the circuit arrangement of FIG. 1 is a so-called half-bridge inverter circuit and is designated as IC.

Values and designations of the various parts of the circuit of FIG. 1 are listed as follows:
Output of Source S: 120 Volt/60 Hz;
Bridge rectifier BR: a bridge of four 1N4004;
C1 & C2: 1 uF/100 Volt(Film-Type);
Rectifiers R1 and R2: 1N4004;
Electrolytic Capacitors EC1 & EC2: 47 uF/160 Volt;
High-Speed Rectifiers HSR1 and HSR2: 1N4937;
Transistors Q1 & Q2: MJE13002;
Capacitor C: 15 nF/630 Volt(High-Q);
Inductor L: 130 turns of three twisted strands of #30 wire on a 3019P-L00-3C8 Ferroxcube Ferrite Pot Core with a 120 mil air gap;
Inductor CLI: 95 turns of #31 wire on a Ferroxcube 1408P-L00-3C8 Ferrite Pot Core with a 40 mil, air gap;
Transformers CT1 & CT2: Wound on Ferroxcube Toroids 213T050 of 3E2A Ferrite Material with three turns of #26 wire for the primary windings and ten turns of #30 wire for the secondary windings;
Fluorescent Lamp FL: Two Sylvania Octron F032/31K Fluorescent Lamps Connected in series.

The frequency of inverter oscillation associated with the component values identified above is approximately 33 kHz.

Details of Operation of the Circuit of FIG. 1

Figure 2:
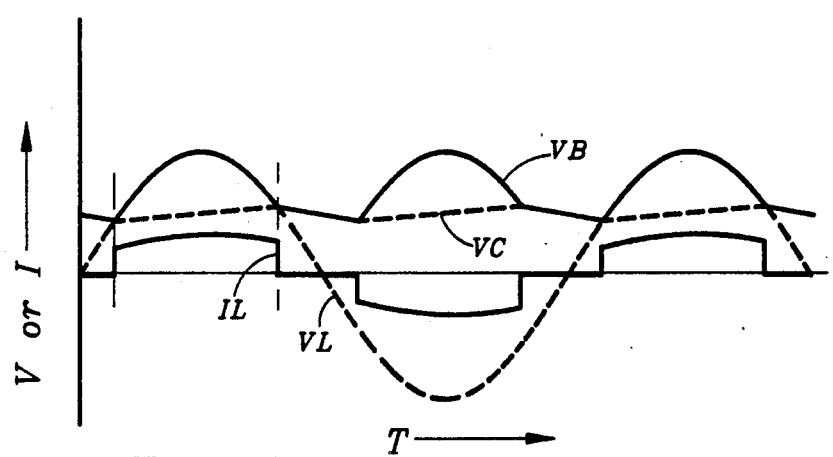
FIG. 2 illustrates typical voltage and current waveforms associated with the basic electronic ballast of FIG. 1.

FIG. 2 illustrates the voltage V and the current I versus time T for some of the voltage and current waveforms associated with the circuit of FIG. 1.

The waveform identified as VL represents the voltage provided by the line voltage source S of FIG. 1. The waveform identified as IL represents the current drawn from this line voltage source.

The waveform identified as VB represents the voltage present between the B− bus and the B+ bus of FIG. 1; and the waveform identified as VC represents the voltage across either one of the energy-storing electrolytic capacitors EC1 or EC2 of FIG. 1.

With reference to FIG. 2, the operation of the circuit of FIG. 1 may be explained as follows.

In FIG. 1, the source S represents an ordinary electric utility power line, the voltage from which is applied directly to the bridge rectifier identified as BR. This bridge rectifier is of conventional construction and provides for the rectified line voltage to be applied to the inverter circuit IC by way of the B+ bus and the B− bus.

Since this rectified line voltage is provided by way of a rectifier means, it is possible to provide for an auxiliary source of voltage to be connected in parallel between the B+ bus and the B− bus—provided that this auxiliary source is also connected by way of a rectifier means. That way, the voltage actually provided between the B+ bus and the B− bus will be the voltage of the source with the largest instantaneous magnitude.

In other words, the current actually provided to the inverter circuit IC of FIG. 1 will come either from the power line or from (either or both of) the two energy-storing electrolytic capacitors EC1 and EC2—depending upon which voltage is largest at the moment. Thus, as long as the absolute magnitude of the voltage on the power line is larger than the voltage on either of the two capacitors, the current will come from the power line; otherwise, it will come from either or both of the two electrolytic capacitors.

The half-bridge inverter circuit IC of FIG. 1 operates in a manner that is analogous with circuits previously described in published literature, as for instance in U.S. Pat. No. 4,184,128 entitled High Efficiency Push-Pull Inverters.

The inverter IC is shown without any means for initiating inverter oscillation. However, once power is applied, oscillation can be initiated simply by momentarily connecting a 50 nF capacitor between the B+ bus and the base of transistor Q2.

Capacitors C1 and C2 are so sized that, in comparison to the energy being used by the inverter over a period comparable to the cycle-period of the power line voltage, they store a negligible amount of energy; which implies that they will not have any significant impact on the gross shape of the voltage between the B+ bus and the B− bus, which is the waveform identified as VB in FIG. 2.

The purpose of capacitors C1 and C2 is that of providing for a relatively low impedance path for the 33 kHz current associated with the half-bridge inverter action.

The output of the half-bridge inverter is a substantially squarewave 33 kHz AC voltage, which is provided between point X and junction CJ. Across this output is connected a resonant or near-resonant L-C series circuit—with the fluorescent lamp being connected in parallel with the tank-capacitor thereof.

The resonant or near-resonant action of the L-C series circuit provides for appropriate lamp operating voltages and currents; which is to say that it provides for lamp ballasting.

One particularly important feature of this method of lamp ballasting relates to the fact that it exhibits exceptionally good regulation: as the magnitude of the 33 kHz squarewave AC voltage applied across the L-C series circuit varies by a certain relative amount, the net resulting lamp power varies by a smaller relative amount.

The reason for this feature of good regulation relates to the well known negative resistance characteristic of fluorescent lamps: as lamp current increases, the corresondingly required lamp voltage decreases, which implies that the lamp resistance decreases relatively even more. In combination with an L-C series-resonant circuit, this characteristic yields the overall effect that, as the lamp power increases, the L-C circuit Q-multiplication factor decreases, thereby tending to offset the increase in lamp power—and vice versa for decreasing lamp power.

(In other words, the ability of the resonant L-C circuit to provide power to the lamp load connected in parallel with its tank-capacitor is proportional to the Q-factor of the circuit; and this Q-factor increases as the power to the lamp decreases.)

In the inverter, transistors Q1 and Q2 are in effect switches that are turned ON and OFF in obverse synchrony at a 33 kHz rate. Thus, junction QJ—which, but for a minute voltage drop across the primary windings of current transformers CT1 and CT2, is electrically the same as point X—is alternately connected with the B+ bus and the B− bus.

Connected to point X, and thereby alternatingly (at a rate of 33 kHz) to the B+ bus and the B− bus, is the current-limiting inductor CLI. By way of this current-limiting inductor and the two high-speed rectifiers HSR1 and HSR2, the 33 kHz squarewave voltage at point X is applied to the two energy-storing electrolytic capacitors EC1 and EC2; which implies that current will be provided to charge these two capacitors as long as the instantaneous voltage at point X is larger in magnitude than the voltage across the capacitors.

In other words, whenever the instantaneous absolute magnitude of the power line voltage is larger than that of the voltage across capacitors EC1 and EC2, these two capacitors will be charged by way of the current-limiting inductor CLI and the two high-speed rectifiers HSR1 and HSR2.

Since the frequency at which these capacitors are being charged is very high compared with the frequency of the power line voltage, the physical size of the current-limiting inductor CLI is very small compared with the size that would have been required if the charging and current-limitation had been performed at the frequency of the power line voltage.

At a given load, the inductance-value of the current-limiting inductor CLI determines the amount of charging current applied to the energy-storing capacitors, and therefore determines the magnitude of the (average) voltage at which the two capacitors operate. In the particular circuit of FIG. 1, the inductance-value of CLI has been so chosen that the average voltage across the electrolytic capacitors stays at about 100 Volt; which implies that the operating current for the inverter will be drawn directly from the power line as long as the absolute magnitude of the power line voltage is higher than about 100 Volt (see waveform IL of FIG. 2), but will be drawn from the electrolytic capacitors whenever the absolute magnitude of the power line voltage is lower than about 100 Volt.

Due to the natural characteristics of the series-resonant ballasting method used, the amount of power provided to the fluorescent lamp does not change substantially over the voltage range associated with the ripple on the inverter DC supply voltage (VB in FIG. 2).

As a result, lamp ionization remains essentially constant at all times throughout the ripple cycle; and lamp efficiency is therefore maintained essentially at the same level as would have been achieved without any ripple on the inverter DC supply voltage.

However, had the inverter DC supply voltage been allowed to fall all the way to zero—which would have been the case without the presence of the auxiliary power source represented by the two electrolytic capacitors—the natural regulation ability of the series-resonant ballasting circuit would of course not have been able to compensate, and lamp ionization could not have been maintained throughout the ripple cycle; which would have resulted in significant reduction of lamp efficiency.

Additional Comments re Circuit of FIG. 1

(a) The concept of power factor correction herein disclosed is not limited to being used just in connection with fluorescent lamp ballasts, nor just with half-bridge inverters. On the contrary, the basic concept can be applied to a wide variety of inverter circuits and applications—especially in connection with self-oscillating inverters.

(b) An alternative way of looking at the arrangement of FIG. 1 is that of considering it as an arrangement for providing auxiliary DC power for the inverter—this auxiliary power being provided by way of energy-storing means, which in turn are being intermittently replenished with energy from the output of the inverter. Thus, the inverter will operate properly from rectified but unfiltered AC line voltage—without permitting the inverter to cease oscillating or the fluorescent lamp to become de-ionized during the periods where the absolute magnitude of the line voltage falls to very low values.

Details of Construction of the Preferred Embodyment

Figure 3:
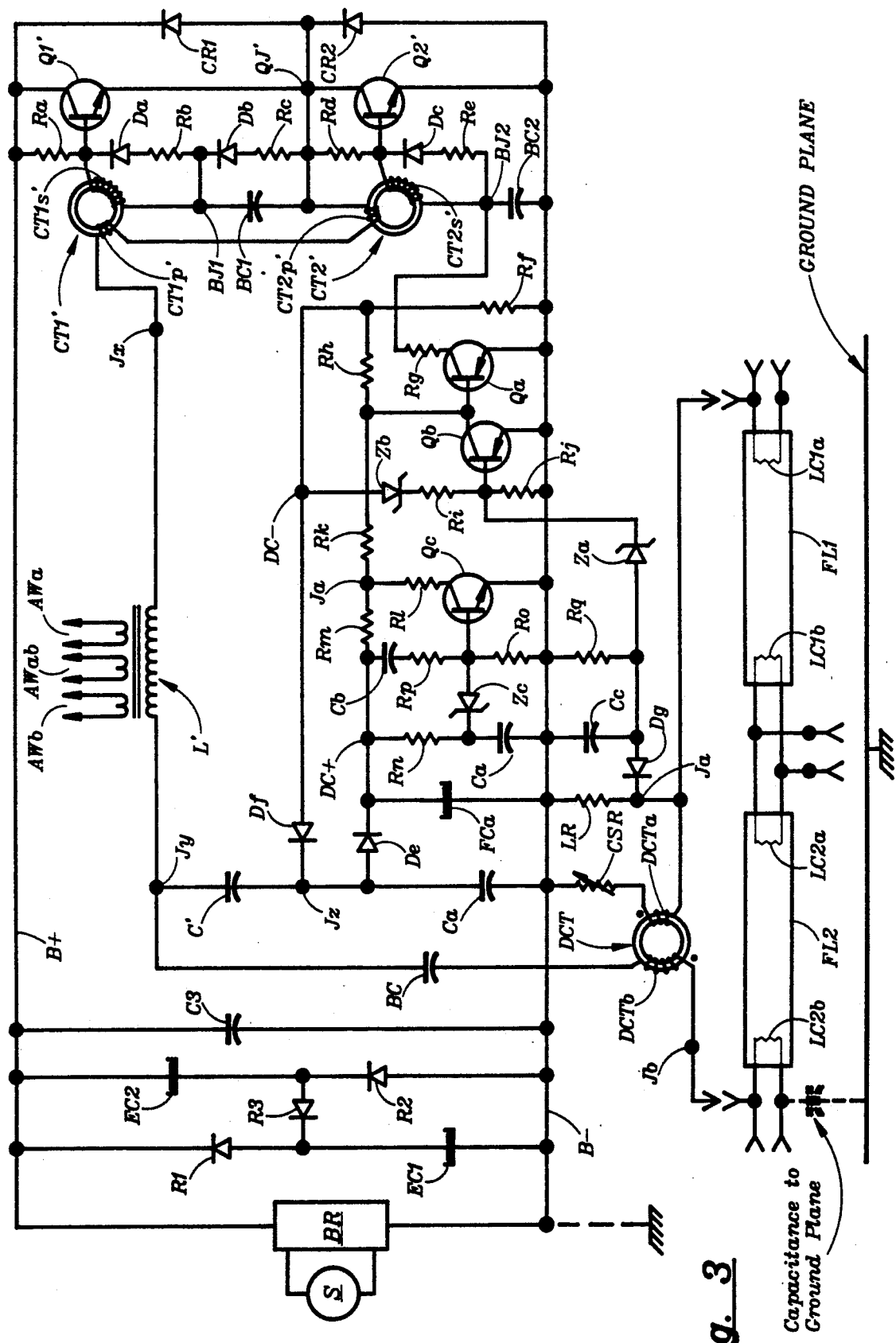
FIG. 3 schematically illustrates the preferred embodiment of the invention.

FIG. 3 schematically illustrates the preferred embodiment of the invention.

In the circuit arrangement of FIG. 3, just as in that of FIG. 1: (i) power line S is connected with bridge rectifier BR, whose output is connected between the B− bus and the B+ bus; and (ii) rectifier R1 and energy-storing capacitor EC1 are series-connected between the B− bus and the B+ bus, as are rectifier R2 and energy-storing capacitor EC2 as well.

A third rectifier R3 is connected with its cathode to the anode of rectifier R1 and with its anode to the cathode of rectifier R2. Thus, the three rectifiers are in effect series-connected between the B− bus and the B+ bus, with their cathodes and anodes so oriented as to permit current to flow through them only in the direction toward the B+ bus.

A high frequency bypass capacitor C3 is connected between the B− bus and the B+ bus.

A first transistor Q1' is connected with its collector to the B+ bus and with its emitter to a junction QJ'. A second transistor Q2' is connected with its collector to junction QJ' and with its emitter to the B— bus.

A first commutating rectifier CR1 is connected with its cathode to the B+ bus and with its anode to junction QJ'. A second commutating rectifier CR2 is connected with its cathode to junction QJ' and with its anode to the B— bus.

A first saturable current transformer CT1' has a secondary winding CT1s' connected between the base of transistor Q1' and a first bias junction BJ1. A second saturable current transformer CT2' has a secondary winding CT2s' connected between the base of transistor Q2' and a second bias junction BJ2.

A first bias capacitor BC1 is connected between bias junction BJ1 and junction QJ'. A second bias capacitor BC2 is connected between bias junction BJ2 and the B— bus.

A resistor Ra is connected between the B+ bus and the base of transistor Q1'; a diode Da is connected with its cathode to the base of transistor Q1'; a resistor Rb is connected between the anode of diode Da and junction BJ1; a diode Db is connected with its cathode to junction BJ1; a resistor Rc is connected between the anode of diode Db and junction QJ'; a resistor Rd is connected between junction QJ' and the base of transistor Q2'; a diode Dc is connected with its cathode to the base of transistor Q2'; and a resistor Re is connected between the anode of diode Dc and junction BJ2.

Current transformer CT1' and CT2' have primary windings CT1p' and CT2p', respectively; which two primary windings are series-connected between junction QJ' and a junction Jx.

A tank inductor L' is connected between junction Jx and a junction Jy; a main tank capacitor C' is connected between junction Jy and a junction Jz; and an auxiliary tank capacitor Ca is connected between junction Jz and the B— bus.

Tank inductor L' has three auxiliary cathode heating windings AWa, AWab and AWb.

A first fluorescent lamp FL1 has lamp cathodes LC1a and LC1b. A second fluorescent lamp FL2 has lamp cathodes LC2a and LC2b. Lamp cathode LC1a is connected with auxiliary winding AWa; Lamp cathodes LC1b and LC2a are connected together as well as with auxiliary winding AWab; and lamp cathode LC2b is connected with auxiliary winding AWb.

A differential current transformer DCT has a first winding DCTa and a second winding DCTb. Winding DCTa is connected in series with a current sensing resistor CSR to form a first series-combination; which first series-combination is connected between the B— bus and a junction Ja; which junction Ja is connected with lamp cathode LC1a. A loading resistor LR is connected between junction Ja and the B— bus. Winding DCTb is connected in series with a DC blocking capacitor BC to form a second series-combination; which second series-combination is connected between junction Jy and a junction Jb; which junction Jb is connected with lamp cathode LC2b.

A diode De is connected with its anode to junction Jz and with its cathode to a DC+ terminal. A filter capacitor FCa is connected between the DC+ terinal and the B— bus. A diode Df is connected with its cathode to junction Jz and with its anode to a DC— terminal. A resistor Rf is connected between the DC— terminal and the B— bus.

A resistor Rg is connected between junction BJ2 and the collector of a PNP transistor Qa, whose emitter is connected with the B— bus. A resistor Rh is connected between the DC— terminal and the base of transistor Qa.

A PNP transistor Qb is connected with its collector to the base of transistor Qa and with its emitter to the B— bus. Its base is connected with the cathode of a Zener diode Za. A resistor Ri is connected between the base of transistor Qb and the cathode of a Zener diode Zb, whose anode is connected with the DC— terminal. A resistor Rj is connected between the base of transistor Qb and the B— bus.

A resistor Rk is connected between the base of transistor Qa and a junction Ja. A resistor Rl is connected between junction Ja and the collector of an NPN transistor Qc, whose emitter is connected with the B— bus. A resistor Rm is connected between junction Ja and the DC+ terminal.

A resistor Rn is connected between the DC+ terminal and the cathode of a Zener diode Zc, whose anode is connected with the base of transistor Qc. A capacitor Ca is connected between the cathode of Zener diode Zc and the B— bus. A resistor Ro is connected between the base of transistor Qc and the B— bus.

A series-combination of a resistor Rp and a capacitor Cb is connected between the base of transistor Qc and the DC+ terminal. A parallel-combination of a resistor Rq and a capacitor Cc is between the anode of Zener diode Za and the B— bus. A diode Dg is connected with its anode to the anode of Zener diode Za and with its cathode to junction Ja.

Details of Operation of the Circuit of FIG. 3

FIG. 4 illustrates various voltage and current waveforms associated with the operation of the circuit of FIG. 3.

FIG. 4(a) shows the 60 Hz sinusoidal power line voltage provided by source S.

FIG. 4(b) shows the 50% amplitude-modulated DC voltage present between the B+ bus and the B+ bus.

FIG. 4(c) shows the waveshape of the current drawn from the power line.

FIG. 4(d) shows the inverter's 33 kHz rectangular wave output voltage under a condition where the ballast output is fully loaded.

FIG. 4(e) shows the inverter's 33 kHz rectangular wave output voltage under a condition where the ballast output is only partially loaded.

FIG. 4(f) shows the inverter's 33 kHz rectangular wave output voltage under a condition where the ballast output is totally unloaded.

FIG. 4(g) shows the 33 kHz substantially sinusoidal voltage at the ballast's output terminal (i.e., either at junction Jy or at junction Jb).

FIG. 4(h) shows the 33 kHz single-wave-rectified unfiltered DC voltage on the DC— terminal.

FIG. 4(i) shows the 33 kHz single-wave-rectified filtered DC voltage on the DC+ terminal.

FIG. 4(j) shows the 33 kHz voltage on the base of transistor Qa under a condition where the ballast output is unloaded.

FIG. 4(k) shows the 33 kHz voltage on the base of transistor Qa under a condition where the ballast output is fully loaded.

The details of the operation of the preferred circuit arrangement of FIG. 3 can best be understood when read with reference to the waveforms of FIG. 4.

The AC-to-DC conversion circuit of FIG. 3 is the same as that of FIG. 1, except that the high-frequency charging of the two energy-storing capacitors EC1 and EC2 has been omitted.

In omitting the high-frequency charging of capacitors EC1 and EC2 (which was done herein for the purpose of simplifying circuit diagram and explanation), the resulting power factor (at which power is drawn from the power line) gets reduced typically from about 95% to about 90%. However, even a 90% power factor is acceptable in many situations.

The two energy-storing capacitors are now charged (in series) directly from the full-wave-rectified power line voltage; which charging occurs at or near the peak of the power line voltage. A single (low-frequency) rectifier R3 is substituted for the two high-frequency rectifiers HSR1 and HSR2.

The DC voltage resulting from the rectifier/filter circuit of FIG. 3 is substantially identical with that of FIG. 1; each resulting in a peak-to-peak amplitude modulation (ripple voltage) of somewhat less than 50%.

The operation of the half-bridge inverter of FIG. 3 is substantially the same as that of FIG. 1 except that, in the inverter circuit of FIG. 3:

(i) inverter operation is self-starting, with no need for triggering;

(ii) base drive to each of the two inverter switching transistors is supplied from a self-generated source of negative (reverse) bias voltage (which is present at bias junctions BJ1 and BJ2), thereby giving rise to more efficient (i.e., faster) switching of the inverter transistors;

(iii) the magnitude of the reverse bias voltage is controlled as a function of the magnitude of the inverter's output current in such manner as to increase the magnitude of the reverse bias voltage (which tends to reduce the magnitude of the inverter output current) with increasing magnitude of inverter output current, thereby providing for automatic reverse bias control; which, in turn, tends to limit variations in the magnitude of the inverter output current as well as to mitigate variations in component parameters; and (iv) the magnitude of the 33 kHz voltage provided at the output of the inverter (at junction Jx) is controlled by controlling the symmetry of the rectangular wave inverter output voltage (thereby controlling the magnitude of the fundamental frequency component of the rectangular wave inverter output voltage); which symmetry is controlled (via controlling the symmetry of the bias voltage on the two bias capacitors) by various parameters such as: magnitude of ballast output voltage (at junction Jy), magnitude of lamp current, etc.

As further help in understanding the operation of the inverter/ballast circuit of FIG. 3, reference is made to U.S. Pat. No. 4,307,353 to Nilssen, particularly to FIG. 3 thereof.

In the inverter ballast circuit of FIG. 3 hereof, for given saturable current feedback transformers (CT1' and CT2') and given switching transistors (Q1' and Q2'), the duration of the ON-time (i.e., forward conduction time) of each of the two switching transistors is directly determined by the magnitude of the bias voltage present at bias junctions BJ1 and BJ2: the more negative the bias voltage at BJ1, the shorter the duration of the ON-time of transistor Q1'; the more negative the bias voltage at BJ2, the shorter the duration of the ON-time of transistor Q2'.

Except to the degree that charge is permitted to leak away from bias capacitor BC1, the bias voltage at bias junction BJ1 will become more and more negative for each inverter switching cycle. This is so for the reason that the forward base current provided to transistor Q1' is drawn out of bias capacitor BC1, while there is no compensating flow of reverse base current. Thus, the bias voltage at junction BJ1 will become more and more negative until a balance is established between the flow of forward base current and the leakage current drawn from bias capacitor BC1 via the leakage path consisting of diode Db and resistor Rc.

The above explanation also pertains to bias capacitor BC2 and the bias voltage at bias junction BJ2, except that the degree to which leakage current is permitted to flow away from bias capacitor BC2 is additionally controlled by way of controlling the effective resistance value of the resistor through which this leakage current is permitted to flow.

That is, the amount of charge permitted to leak away from bias capacitor BC2 is controlled by the value of resistor Rg as well as the effective conductivity of transistor Qa.

By way of the arrangement consisting of capacitor Ca, diodes De and Df, filter capacitor FCa, and resistor Rf, transistor Qa is caused to switch ON (i.e., into a fully conductive state) once each cycle of the 33 kHz inverter output voltage. As a result, charge is permitted to flow from bias capacitor BC2, via resistor Rg, for a certain part of each full period of the 33 kHz rectangular wave inverter output voltage. The longer be this part (i.e., the larger the leakage duty-cycle), the larger be the amount of charge allowed to leak away from bias capacitor BC2; the shorter be this part (i.e., the smaller the leakage duty-cycle), the smaller be the amount of charge allowed to leak away from bias capacitor BC2.

More particularly, a 33 kHz substantially sinusoidal control voltage gets established across auxiliary tank capacitor Ca, whose capacitance value is about 20 times larger than that of main tank capacitor C'. This 33 kHz control voltage, which is provided at junction Jz, therefore has a magnitude that is proportional to the magnitude of the ballast output voltage, which is provided at junction Jy.

The 33 kHz control voltage gets rectified by diode De and filtered by filter capacitor FCa, thereby providing at the DC+ terminal a positive DC voltage of substantially constant magnitude—as illustrated by FIG. 4(i).

The 33 kHz control voltage also gets rectified by diode Df and, in combination with resistor Rf, gives rise to a non-filtered single-wave-rectified negative voltage (i.e., negative voltage pulses) to be provided at the DC− terminal—as illustrated by FIG. 4(h).

By way of resistors Rm, Rk and Rh, the constant-magnitude positive voltage at the DC+ terminal gets added to the negative voltage pulses at the DC− terminal, and—from the junction between resistors Rh and Rk—gets applied to the base of transistor Qa. Thus, as long as transistor Qb is non-conductive, the voltage provided to the base of transistor Qa will be as illustrated by FIG. 4(j).

However, as the magnitude of the 33 kHz control voltage provided at junction Jz increases, a point is reached where Zener diode Zb starts to conduct at the peaks of the negative voltage pulses provided at the DC− terminal. Transistor Qb gets switched ON each time Zener diode Zb conducts; which means that transistor Qa gets switched OFF each time Zener diode Zb conducts. As an overall result, as the magnitude of the 33 kHz control voltage increases beyond a level effectively predetermined by the Zener voltage of Zener diode Zb, the ON-time of transistor Qa gets interrupted and effectively diminished—as illustrated by FIG. 4(k)—eventually to the point where transistor Qa becomes substantially non-conductive.

By choice of Zener diode Zb, the magnitude of the 33 kHz control voltage at junction Jz can be prevented from exceeding any given level; which means that the magnitude of the 33 kHz ballast output voltage can also be prevented from exceeding any given level. In the preferred embodiment of FIG. 3, Zener diode Db is so chosen that—in the absence of ballast loading and in the absence of an ignition pulse (to be described hereinbelow)—the magnitude of the ballast output voltage is maintained at a level somewhat higher than the maximum normal operating voltage of the two series-connected fluorescent lamps.

More particularly, as long as transistor Qc is non-conductive, the magnitude of the ballast output voltage is limited by action of Zener diode Zb to a first level that is just above the maximum normal lamp operating voltage; which first level is too low to cause lamp ignition (or starting). However, with transistor Qc conductive, the action (i.e., dividing ratio) of the voltage dividing network of resistors Rm, Rk and Rn will change, and the magnitude of the ballast output voltage will be limited at a second level that is substantially higher than the first level.

By action of circuit components Rn, Ca, Zc, Cb, Rp, and Ro, after an initial period of about one second (during which the magnitude of the ballast output voltage remains at the first level), transistor Qc gets switched ON for a brief period of about 20 milli-seconds. Thus, for this brief period, the magnitude of the ballast output voltage will be limited at the second level; which second level is chosen such as to be high enough to cause decisive lamp ignition.

In other words, the magnitude of the ballast output voltage is normally prevented from exceeding the first level. However, once every second or so an ignition pulse is provided in the sense of permitting for a period of about 20 milli-seconds the magnitude of the ballast output voltage to rise to the second level.

Of course, after the lamps have ignited, the actual magnitude of the ballast output voltage will be limited to that of the actual operating voltage of the lamps; which actual magnitude is lower than the first level.

After lamp ignition, the resulting lamp current flows through the two windings of differential current transformer DCT. Since the two windings are substantially identical except for polarity, no net voltage will develop across either of the two windings as a result of the lamp current.

However, whether or not lamp current is flowing, if a current were to flow from the ballast output terminal (i.e., from junction Jy) via winding DCTb, and if that current were not to flow through winding DCTa, a 33 kHz voltage would be generated across each of the two transformer windings; the magnitude of which 33 kHz voltage would be determined by the resistance of loading resistor LR.

Thus the presence of a 33 kHz voltage at junction Ja is indicative of a ground-fault condition, with the magnitude of the 33 kHz voltage being an indication of the magnitude of the ground-fault current.

In the circuit arrangement of FIG. 3, the 33 kHz voltage at junction Ja is rectified by diode Dg, at least partially filtered by capacitor Cc and—by way of Zener diode Za—applied to the base of transistor Qb. Thus, if the magnitude of the ground-fault current were to exceed a level high enough to cause current to flow through Zener diode Za, transistor Qb would be switched ON; which would mean that transistor Qa would be switched OFF; which, in turn, would mean that the magnitude of the reverse bias voltage on bias capacitor BC2 would increase to a level high enough to cause the magnitude of the ground-fault current to decrease far enough to cause transistor Qa to be switched back ON; etc.

In other words, by way of negative feedback, the magnitude of the ground-fault current is prevented from exceeding a pre-established magnitude; which pre-established magnitude is determined by the Zener voltage of Zener diode Za. In the preferred embodiment of FIG. 3, Zener diode Za is so chosen as to prevent the magnitude of the ground-fault current from exceeding about 30 milli-Ampere; which magnitude of current is —at 33 kHz—considered substantially safe from electrical shock hazard.

Any lamp current actually flowing will flow through resistor CSR (which may be made adjustable) and establish a 33 kHz voltage thereacross. Under normal operating conditions, the desired magnitude of the lamp current will be about 350 milli-Ampere; and the resistance value of resistor CSR is so chosen (or adjusted) as to cause the 33 kHz voltage developing across resistor CSR at a lamp current of 350 milli-Ampere to be of such a magnitude as barely not to cause current to flow through Zener diode Za; whereas, at a lamp current of magnitude slightly higher than 350 milli-Ampere, there will be current flowing through Zener diode Za.

Thus, via the same circuit mechanism by which the magnitude of the ground-fault current is limited to 30 milli-Ampere, the lamp current is limited to 350 milli-Ampere (or, by adjustment of resistor CSR, to any other desired level).

The maximum resistance value of resistor CSR is chosen to be so low as not to have a 33 kHz voltage of significant magnitude develop across it as a result of a (ground-fault) current of up to about 30 milli-Ampere; whereas, on the other hand, at a (lamp) current of 350 milli-Ampere, its resistance value is high enough to cause a 33 kHz voltage of significant magnitude to develop across it.

In particular and by way of example, the resistance values of resistors CSR and LR may be chosen (and/or adjusted) to be 12 Ohm and 120 Ohm, respectively. Then, in response to a ground-fault current of 30 milli-Ampere, a voltage of only 0.36 Volt magnitude develops across resistor CSR, whereas a voltage of 3.6 Volt magnitude develops across resistor LT. With Zener diode Za so chosen as to respond at a voltage of about 4.0 Volt magnitude (as presented at junction Ja), any ground-fault current flowing would be limited in magnitude to about 30 milli-Ampere. However, in response to a lamp current of 350 milli-Ampere, a voltage of about 4.0 Volt develops across resistor CSR, while no voltage at all develops across resistor LR. Thus, just as any ground-fault current would be limited to a maximum magnitude of about 30 milli-Ampere, any lamp current would be limited to a maximum magnitude of about 350 milli-Ampere.

To obtain regulation of the lamp current, the ballast circuit components would be so chosen or adjusted that—without any feedback from (or voltage present at) junction Ja—the magnitude of the lamp current would exceed 350 milli-Ampere. Then, as soon as feedback from junction Ja is provided for, the magnitude of the lamp current will indeed be regulated (as opposed to merely limited) to 350 milli-Ampere.

Additional Comments re Circuit Arrangement of FIG. 3

(a) Commutating rectifiers CR1 and CR2 serve the purpose of providing a path for inductive current flowing through tank inductor L' at the moment when switching transistors Q1' and Q2' are switched OFF. Any inductive current flowing at the moment transistor Q2' is switched OFF will find its way through commutating rectifier CR1 and back into the DC supply; which is to say: it will be used to charge capacitor C3.

(b) Capacitor C3, which is a high-frequency bypass capacitor, is of such capacitance value as to be capable of storing an amount of energy commensurate with the amount of energy handled by the inverter and the L-C circuit per cycle of the 33 kHz inverter voltage. However, the capacitance of capacitor C3 is far too small to provide a significant filtering effect at 120 Hz.

(c) To minimize energy losses, resistor CSR may be a reactive element. In particular, resistor CSR may be substituted with a capacitive reactance of about $-j12$ Ohm at 33 kHz.

(d) One purpose of blocking capacitor BC is that of preventing unidirectional current flow flowing through the fluorescent lamps; which would be highly detrimental to lamp life expectancy. Another purpose is that of providing a high impedance to the flow of 60 Hz and/or 120 Hz ground-fault currents.

(e) The control arrangement relating to the ground-fault current and the lamp operating current is in effect an OR-circuit: whichever of the ground-fault current or the lamp operating current that exceeds a certain pre-established limit will cause the negative feedback (magnitude-limiting) action to take effect.

For more marked separation between the sensing of ground-fault current and the sensing of lamp operating current, a tertiary winding can be provided on differential current transformer DCT; which tertiary winding would permit the control voltage developing across resistor LR to be completely separated from the control voltage developing across resistor CSR; which two resistors could then both be referenced to the B— bus.

(f) The control circuit arrangement described in connection with the preferred embodiment of FIG. 3 provides the indicated ignition pulsing feature by effectively pulsing the resistive divider constituted by resistors Rm, Rk and Rn. That is, this ignition pulsing is done by changing the effective magnitude of the positive reference voltage at the DC+ terminal {see FIG. 4(i)} to which the pulsed negative voltage at the DC— terminal {see FIG. 4(h)} is added. For those situations where a larger degree of ignition pulsing is required, the ignition pulsing may better be accomplished by way of effectively changing the magnitude of the pulsed negative voltage at it is applied to Zener diode Zb; which, for instance, may be accomplished by connecting the anode of Zener diode Zb to the output side of a controllable voltage divider similar to that consisting of elements Rm, Rk, Rn, R1 and Qc.

(g) The power line conductors of an ordinary electric utility power line are always referenced to earth ground; which is to say that they are always electrically connected with earth ground.

For effective lamp ignition, a Ground Plane should be located adjacent to the fluorescent lamps—as indeed indicated in FIG. 3. This Ground Plane should then be connected with earth ground.

(h) In an electronic ballast for fluorescent lamps, such as that of FIG. 3, in order to aid lamp ignition, it is normally desirable to permit a certain modest amount of starting aid current to flow between the lamp and its Ground Plane. This starting aid current, which actually flows between the high-potential (or "hot") side of the gas column within the lamp and the nearby Ground Plane (i.e., through the capacitance between the "hot" side of the lamp gas column and the Ground Plane), facilitates ionization of the gas in the lamp. This starting aid current actually flows from one of the ballast's output terminals, to earth ground, and back to the ballast via its power line connection terminals. In the arrangement of FIG. 3, the starting aid current flows from the ballast output terminal at junction Jb, through the "Capacitance to Ground Plane", to the Ground Plane, to earth ground, to the power line conductors, and finally back to the ballast and junction Jb by way of bridge rectifier BR. To be effective, the magnitude of this starting aid current need not exceed a few milli-Ampere. In any case, to be effective, the magnitude of the starting aid current need not exceed that of a current (of the same frequency) considered safe from electric shock hazard.

(i) It is believed that the present invention and its several attendant advantages and features will be understood from the preceeding description. However, without departing from the spirit of the invention, changes may be made in its form and in the construction and/or interrelationships of its component parts, the form herein presented merely representing the currently preferred embodiment.

I claim:

1. An arrangement comprising:
    frequency-converting ballast means connected with the power line conductors of an ordinary electric utility power line and operative to provide an output voltage between a first and a second ballast terminal; the power line conductors being electrically connected with ground; any current flowing out of the first ballast terminal being identified as a first current; any current flowing into the second ballast terminal being identified as a second current; any difference between the first current and the second current being identified as a differential current; the frequency of the output voltage being substantially higher than that of the power line voltage present between the power line conductors; the frequency-converting ballast means having: (i) control means operative on receipt of a control action to control the magnitude of the differential current, and (ii) current sensing means operative to sense the magnitude of any differential current and to provide said control action to said control means whenever this magnitude exceeds a predetermined level; and
    gas discharge lamp means operative to connect between the first and second ballast terminals and, when indeed so connected, to cause a lamp current to flow therebetween; the lamp current flowing out of the first ballast terminal and into the second ballast terminal, thereby not causing any differential current to flow;

an impedance means being at times connected between the first ballast terminal and ground, thereby at times causing a differential current to flow;

whereby the arrangement is operative: (i) to permit differential current to flow; but (ii) to prevent the magnitude of this differential current from exceeding a first predetermined level even for a brief period of time.

2. The arrangement of claim 1 wherein the frequency-converting ballast means additionally includes means to sense lamp current and to prevent its magnitude from exceeding a second predetermined level.

3. An arrangement comprising:
a source providing a substantially sinusoidal power line voltage at a pair of power line terminals; the power line terminals being electrically connected with earth ground;
rectifier means connected with the power line terminals and operative intermittently and periodically to supply rectified power line current to a pair of DC supply terminals; a DC supply voltage existing between the DC supply terminals;
energy-storing means connected in circuit with the DC supply terminals and operative to supply unidirectional current thereto during periods when rectified power line current is not being supplied thereto; the energy-storing means including a first and a second energy-storing capacitor means; a first DC voltage existing across the first energy-storing capacitor means; a second DC voltage existing across the second energy-storing capacitor means; the maximum absolute magnitude of the first DC voltage being no higher than than about half the peak absolute magnitude of the power line voltage; the maximum absolute magnitude of the second DC voltage being no higher than about half the peak absolute magnitude of the power line voltage; the absolute magnitude of the DC supply voltage being effectively prevented from: (i) decreasing below the absolute magnitude of the first DC voltage, and (i) increasing above the sum of the absolute magnitudes of the first DC voltage and the second DC voltage; the instantaneous absolute magnitude of the DC supply voltage therefore being substantially equal to the larger of: (i) the instantaneous absolute magnitude of the power line voltage, and (ii) the instantaneous absolute magnitude of the first DC voltage;
inverter ballast circuit connected with the DC terminals and operative to provide an output voltage between a first and a second ballast terminal; any current flowing out of the first ballast terminal being identified as a first current; any current flowing into the second ballast terminal being identified as a second current; any difference between the first current and the second current being identified as a differential current; the ballast means having control means operative to limit the magnitude of the differential current;
gas discharge lamp means operative to connect between the first and second ballast terminals and, when indeed so connected, to cause lamp current to flow therebetween; and
impedance means connected between the first ballast terminal and earth ground, thereby causing a differential current to flow; the control means preventing the magnitude of the differential current from exceeding a predetermined level.

4. The arrangement of claim 3 wherein : (i) to provide for effective lamp ignition, a certain amount of differential current has to flow; (ii) said certain amount of differential current is of magnitude below said predetermined level; and (iii) said certain amount of differential current is indeed allowed to flow.

5. The arrangement of claim 3 wherein: (i) a certain amount of differential current is indeed allowed to flow; and (ii) said certain amount of differential current is sufficiently low not to constitute an electrical shock hazard to human beings.

6. The arrangement of claim 3 wherein an electrical conduction path exists between the ballast terminals and the power line terminals; the electrical conduction path running through the rectifier means and being operative to permit the flow of substantive amount of current at the frequency of the output voltage.

7. An arrangement comprising:
rectifier means connected with the power line conductors of an ordinary electric utility power line and operative to provide a DC supply voltage at set of DC terminals; the power line conductors being referenced to earth ground; and
electronic ballast means connected with the DC terminals and operative to provide an output voltage between a first ballast terminal and a second ballast terminal; any current flowing from the first ballast terminal being defined as a first current; any current flowing from the second ballast terminal being defined as a second current; any current flowing from the combination of the two ballast terminals being defined as a differential current; a gas discharge lamp means being disconnectably connected with the ballast terminals and, when indeed so connected, drawing therefrom a lamp current; an impedance means being connected between the combination of the two ballast terminals and earth ground; the impedance means being operative to draw a differential current; the electronic ballast means having control means connected in circuit with the ballast terminals and, in response to current flowing therefrom, being operative to permit the flow therefrom of the lamp current as well as the differential current; the magnitude of the differential current being prevented by said control means from exceeding a predetermined level even for a prief period of time; the predetermined level being so low as not to constitute an electric shock hazard to a person being subjected to said differential current.

8. The arrangement of claim 7 wherein the control means is additionally operative to prevent the magnitude of the lamp current from exceeding a pre-established level; the pre-established level being higher than the predetermined level.

9. An arrangement comprising:
rectifier means connected with the power line conductors of an ordinary electric utility power line and operative to provide a DC supply voltage at set of DC terminals; the power line conductors being referenced to earth ground; and
electronic ballast means connected with the DC terminals and operative to provide a ballast output voltage to a gas discharge lamp means connected with a first ballast terminal; the ballast output voltage having a first magnitude when referenced to a second ballast terminal and a second magnitude when referenced to earth ground; any current flowing between the first ballast terminal and the second ballast terminal being defined as a load current; any current flowing between the first ballast terminal and earth ground being defined as a ground loop current; the electronic ballast means having control means operative, in response to receiving an electrical control signal, to control the magnitude of the ground loop current; a current sensor means being connected in circuit with the lamp terminals and operative, in response to current flowing therefrom, to provide said electrical control signal; the magnitude of the ground loop current thereby being permitted to be as high as, but prevented from exceeding, a predetermined level; the predetermined level being: (i) sufficiently high to permit the flow via the gas discharge lamp to earth ground of a starting aid current of sufficient magnitude to materially facilitate lamp ignition, but (ii) sufficiently low not to constitute an electric shock hazard to a person being subjected to said ground loop current.

10. The arrangement of claim 9 wherein the control means is also operative to prevent the magnitude of the load current from exceeding a certain pre-established level; the pre-established level being higher than the predetermined level.

11. The arrangement of claim 9 wherein: (i) a starting aid current is indeed caused to flow; and (ii) the magnitude of this starting aid current is sufficiently high to substantially facilitate lamp ignition, yet lower than the predetermined level.

12. An arrangement comprising:
a source providing a power line voltage at a pair of power line terminals; one of the power line terminals being defined as a ground terminal;
ballast means connected with the power line terminals; the ballast means having a first and a second ballast terminal; a first ballast voltage existing between the ground terminal and the first ballast terminal; a second ballast voltage existing between the ground terminal and the second ballast terminal; any current flowing between the first and the second ballast terminal being defined as a load current; any current flowing between the ground terminal and the combination of the two ballast terminals being defined as a ground loop current; the ballast means including control means operative, in response to receiving a control signal at a control input, to control the magnitude of the ground loop current;
gas discharge lamp means disconnectably connected between the first and the second ballast terminal; the gas discharge lamp means, when indeed so connected, being operative to cause a load current to flow therebetween;
impedance means connected between the first ballast terminal and the ground terminal; the impedance means giving rise to a ground loop current; the magnitude of this ground loop current being, in the absence of said control signal, larger than a certain level; and
current sensor means connected in circuit with the control input as well as with the ballast and ground terminals; the current sensor means being operative to sense the ground loop current and to provide the control signal in response thereto; the control means thus being provided with said control signal, thereby causing the magnitude of the ground loop current to be controlled in such manner as to permit it to be as large as, but not to exceed, said certain level.

13. The arrangement of claim 12 wherein the current sensor means is: (i) responsive to the load current as well; and (ii) operative to prevent the magnitude of the load current from exceeding a pre-establshed level.

14. The arrangement of claim 12 wherein the fundamental frequency of the first ballast voltage is substantially higher than that of the power line voltage.

15. The arrangement of claim 12 wherein the impedance means includes a ground plane mounted adjacent the gas discharge lamp.

16. An arrangement comprising:
rectifier and filter means connected in circuit with the power line conductors of an ordinary electric utility power line and operative to provide a DC supply voltage between a B− bus and a B+ bus; an AC power line voltage being provided at the power line conductors; the DC supply voltage being characterized as having a magnitude that varies periodically at a frequency equal to twice the frequency of the AC power line voltage; the rectifier and filter means being characterized by including a first series-combination of a first rectifier and a first energy-storing capacitor and a second series-combination of a second rectifier and a second energy-storing capacitor; the first rectifier having a cathode connected with the B+ bus; the second rectifier having an anode connected with the B− bus; the power line conductors being referenced to earth ground; and
electronic ballast means connected with the DC terminals and operative to provide a ballast output voltage between a first ballast terminal and a second ballast terminal; any current flowing from the first ballast terminal being defined as a first current; any current flowing from the second ballast terminal being defined as a second current; any current flowing from the combination of the two ballast terminals being defined as a differential current; a gas discharge lamp means being disconnectably connected with the ballast terminals and, when indeed so connected, drawing therefrom a lamp current; an impedance means being at times connected between the combination of the two ballast terminals and earth ground; the impedance means being operative to draw a differential current; the electronic ballast means having limiting means operative to permit the flow from the ballast terminals of the lamp current but to prevent the flow therefrom of a differential current having a magnitude in excess of a predetermined level.

17. The arrangement of claim 16 wherein the DC supply voltage is further characterized by having an instantaneous absolute magnitude substantially equal to that of the AC power line voltage for at least half the duration of each complete cycle of the AC power line voltage.

18. The arrangement of claim 16 wherein: (i) a first DC voltage exists across the first energy-storing capacitor; and (ii) the instantaneous absolute magnitude of the DC supply voltage is substantially equal to the larger of the instantaneous absolute magnitude of the first DC voltage and that of the AC power line voltage.

* * * * *